No. 875,083.  
PATENTED DEC. 31, 1907.
A. G. LAMB.  
RUFFLER ATTACHMENT FOR SEWING MACHINES.  
APPLICATION FILED FEB. 5, 1907.
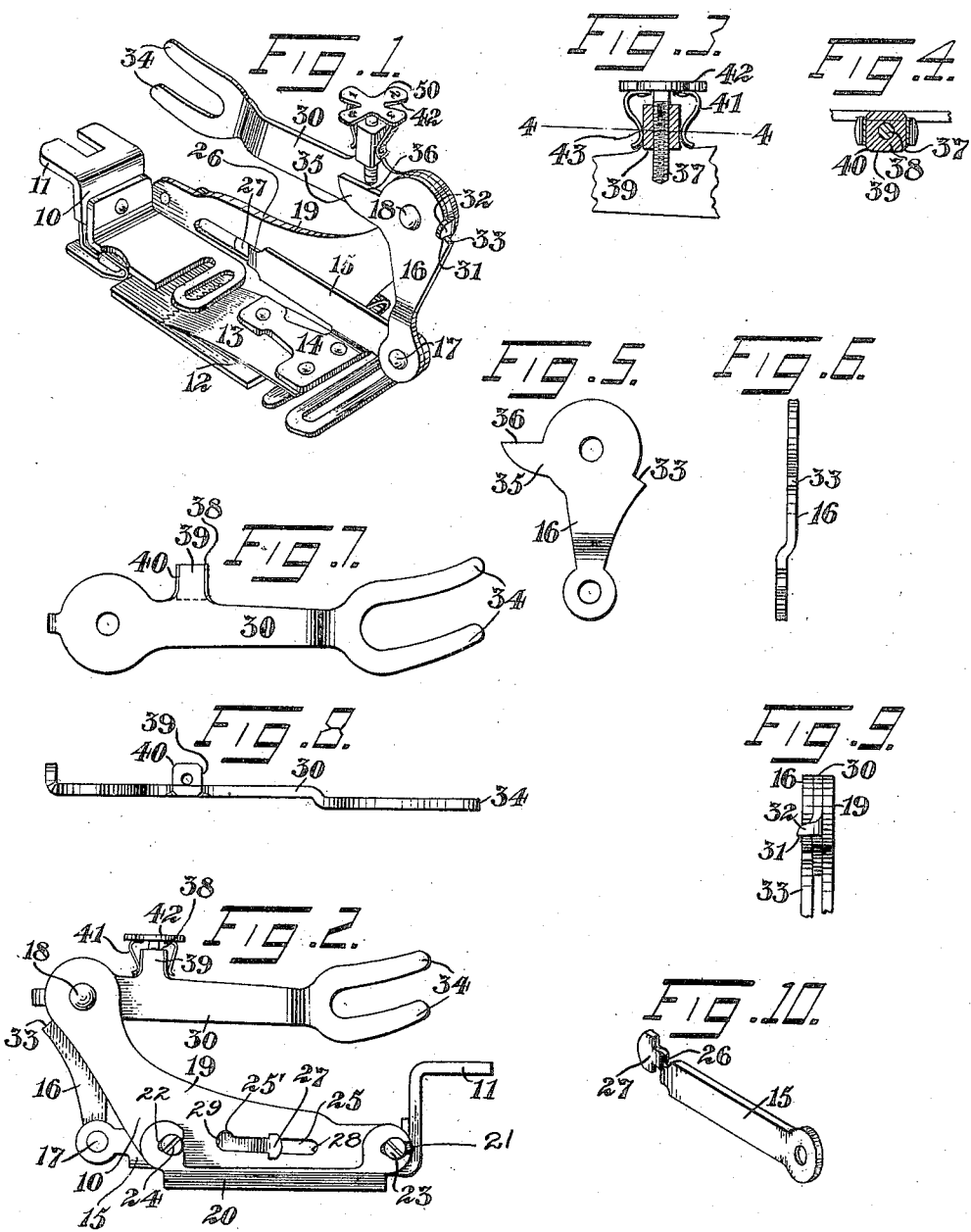
Witnesses:  
Morris Levy  
H. Fleischer
Inventor:  
Amherst G. Lamb.  
By his Attorney,  
F. H. Richards.

UNITED STATES PATENT OFFICE.

AMHERST G. LAMB, OF TORRINGTON, CONNECTICUT, ASSIGNOR TO EXCELSIOR NEEDLE COMPANY, OF TORRINGTON, CONNECTICUT, A CORPORATION OF CONNECTICUT.

RUFFLER ATTACHMENT FOR SEWING-MACHINES.

No. 875,083.   Specification of Letters Patent.   Patented Dec. 31, 1907.

Application filed February 5, 1907. Serial No. 355,807.

*To all whom it may concern:*

Be it known that I, AMHERST G. LAMB, a citizen of the United States, residing in Torrington, in the county of Litchfield and State of Connecticut, have invented certain new and useful Improvements in Ruffler Attachments for Sewing-Machines, of which the following is a specification.

This invention relates to an improved ruffler attachment for sewing machines, the object of the invention being to provide improved mechanism for controlling the ruffler blade and more particularly to means for preventing accidental displacement of the set screw for regulating the stroke of the ruffler blade, and for indicating the exact position of such set screw. And also for relieving the cloth from the pressure of the blade in its backward excursion and for causing the blade to increase its hold upon the fabric as it moves this toward the needle, so that its strength of grip is continuously being augmented throughout the entire forward or ruffling stroke. This is accomplished in the present showing by means of a cam groove with which a stud carried by the ruffler blade carrier will coöperate, so that as the blade is drawn backwardly, it will also be drawn away from the separator plate and as the blade is advanced to carry the cloth toward the needle and to ruffle the same, it will be caused to advance toward such plate. The control of the set screw above alluded to will be effected by having upon the actuator arm an angular boss or a squared nut which will carry the set screw, the set screw having upon it a pair of spring fingers for engaging the sides of the nut or the angular faces of the boss, so that the screw will be held from reverse rotation after it has been properly set and will always be held in the desired position of adjustment. The set screw itself may carry a scale indicating its exact position, so that if the nut has four faces and the set screw four index characters a quarter of a revolution of the nut may be observed by this means and accurate adjustment of the length of stroke of the ruffler blade and consequently accurate adjustment of the ruffle may always be had.

In the drawings accompanying and forming a part of this specification, Figure 1 is a perspective view of a ruffler attachment provided with a form of the present improvement. Fig. 2 is a side view of the device illustrated in Fig. 1 but looking at the attachment from the opposite side to that seen in that figure. Fig. 3 is a side view of a portion of the actuator arm, the angular boss or nut carried thereby being shown on a section taken on a plane parallel with the plane of the arm; the set screw is shown in elevation in proper position in the nut. Fig. 4 is a plan view taken on a plane indicated by the line 4—4 in Fig. 3. Figs. 5 and 6 represent a face view and an edge view of the link which is pivoted to the frame and attached to the blade carrier, and which will derive motion from the actuator arm. Figs. 7 and 8 show the face view and edge view respectively of the actuator arm; Fig. 9 is a detail showing the back edges of the actuator arm, the link, and the portion of the frame which supports the stud for carrying these; and Fig. 10 is a perspective view of the ruffler blade carrier.

Although a complete attachment is illustrated yet certain of the parts herein shown do not form a part of the present invention and will only be referred to in so far that an understanding of these may be necessary to a more complete exposition of the present improvement. The various operative parts of the device are carried by a frame designated in a general way by 10. This frame will, according to the present practice of making sewing machine attachments, be formed of sheet metal as will also the other parts of the device. The frame is provided with a portion 11 for attachment to a sewing machine presser bar. This attachment being applied to the presser bar after the presser foot has been removed therefrom. A separator plate 12 is shown above which a gathering or ruffler blade 13 is mounted for reciprocation. The ruffler blade is shown carried by an arm 14 which projects laterally from a carrier or slide, in the present illustration shown in the form of a bar 15. A link 16 is shown pivoted at 17 to the bar 15 and pivoted by a stud 18 to a side plate 19 of the frame. A plate 20, for carrying the separator plate, is adjustably attached to the portion 19 of the frame at its rear portion, that is for convenience assuming that the side shown in Fig. 2 is the rear portion, by means of slots 21, 22 and screws 23, 24. The portion 19 of the frame has a cam slot 25 which controls the movement of the ruffler blade carrier by means of a neck or stud 26 carried by the slide 15. The neck 26 is bent transversely to the body portion of the slide and carries a head 27 bent transversely to the neck, the face of the head, however, lying in a plane parallel to the face of the body of the slide which will make it offset from the body. The length of the neck will be proportioned to the thickness of the metal of the portion 19 of the frame.

When it is desired to assemble the parts the head 27 and the neck 26 will be inserted through the slot 25, the slide at this time being held transversely to its normal position. After the parts have been brought to such a position that the face of the slide rests against the face of the portion 19 of the frame the neck 26 will be moved to the enlargement 25′ of the slot 25 when the slide may be then turned to its proper position and the rivet 17 inserted which will hold it in place. This form of construction requires less skill in assembling, since it requires considerable experience and constant careful attention of the workman to fasten a rivet which will take the place of the neck or stud 25 so that there will be no lost motion and also so there will be no undue friction; but by this present improvement after the dies have been properly shaped the workman who performs the operation of assembling will not have to employ such a high order of skill as he would in case a rivet was used in this situation.

It will be seen that the forward end 28 of the slot 25, that is, by forward end is meant the end toward the needle and the direction in which the ruffler blade performs its work, is lower than the end 29, or the rearward end of such cam slot. Thus it will be seen that as the link 16 reciprocates the ruffler blade carrier and thereby the ruffler blade; that in the forward or fabric feeding excursion of the blade, the blade will be gradually pressed more strongly toward the separator plate so that during the latter portions of the ruffling movement, the hold of the blade upon the fabric will be strong, the gripping action being augmented as the resistance to the ruffling increases. Upon the backward or idle excursion of the ruffler blade, this is drawn away from the separator plate and permitted to more easily slide over the fabric, so that the tendency of the ruffler blade to draw the fabric back with it will be largely minimized.

The oscillation of the link 16 is effected in the present showing by means of an actuator arm 30 mounted upon the stud 18 and having an abutment face 31, in the present instance carried by a lug 32, for engaging an abutment face 33 on the link 16. These abutment faces 33 and 31 will preferably be fixed, since it is through their engagement upon the raising of the needle bar, the needle nut of which will be embraced by the forked ends 34 of the actuator arm, the ruffler blade carrier and with it the ruffler blade will be moved forward, and by means of the neck or stud 26 and cam groove 25, will be moved downwardly while ruffling or gathering the fabric and pushing the same toward the needle. The ruffling movement is generally required to have an arbitrary forward limit, the backward movement of the ruffler blade over the fabric for the purpose of assuming a position to again ruffle or gather the fabric is preferably adjustable, so that the amount of ruffling done at each reciprocation of the needle bar may be adjusted.

The link 16 is shown as carrying a projection 35 having a face 36 for engagement of a set screw 37 carried by the actuator arm. The set screw, in the present instance is shown as traversing an angular boss or squared nut 38 carried by the actuator arm. In the present instance, the boss or nut is shown as having a number of flat faces 39 disposed in planes parallel with the axis of rotation of the set screw 37. In the present illustration, there are four of such faces and their corners are beveled off as at 40. These faces are for the engagement of spring fingers 41 carried by the head 42 of the set screw. By this means, the set screw will be securely held in whatever position of adjustment it may be placed in. The disposition of the faces 39 is such that in connection with the bevel 40, the screw will automatically upon being brought almost to or slightly beyond the desired position, be moved forward or backward into the proper position. It will be noted that the spring fingers 41 each has a bend in it forming a bearing portion 43 so that as the set screw is reciprocated through the nut or boss the bearing portions will engage different surfaces upon the longitudinal faces 39, thus greatly increasing the length of life of and the accuracy of the faces 39 when these are considered in the light of stop faces for determining the position of the parts. The set screw 37 will engage the face 36 upon the downward stroke of the needle bar and draw the ruffler blade, by means of the carrier, backward over the fabric and by means of the stud 26 and slot 25 will raise the blade so that its pressure upon the cloth is reduced and in some instances removed.

It may be desirable at times to indicate to the eye, the positions of adjustment of the set screw and to this end a series of index fingers indicated by 50 are illustrated in Fig. 1 upon the head 42 of the set screw. By this means the operator can readily tell in what position the set screw is placed so that accurate adjustment can be had.

In the operation of the device as herein illustrated the forward or working stroke of the ruffler blade will be constant, since the ruffler blade 13, controlled by the carriage or slide 15, will be advanced by means of the face 31 on the actuator arm 30 engaging the face 33 upon the link 16, which is pivoted to and controls the movement of such slide or carrier, these faces 33 and 31 are not adjustable in the present illustration, and consequently as the actuator arm 30 is reciprocated, by means of the needle nut engaging the forked arms 34, each forward excursion of the ruffler blade will be to a predetermined and arbitrary point. The backward movement of the ruffler blade for the purpose of gaining a fresh supply of cloth will be adjustable for the purpose of adjusting the amount of gathering to be done at each stitch and this adjustment is accomplished by means of a set screw 37 which engages the face 36 upon the link 16. The spring arms 41, above referred to, hold the set screw in its position of adjustment, the index scale 50 indicating the precise position of the set screw. In its forward excursions the ruffler blade will be drawn toward the separator plate by means of the neck or stud 26 and the cam slot 25 and in its backward excursions will be drawn away from this plate by the same means.

Having thus described my invention, 1 claim:

1. In a ruffler, the combination with a frame, of a ruffler blade carrier, a link pivoted to the frame and to said carrier, a separator plate carried by the frame, a ruffler blade mounted upon the carrier above said plate, said carrier having a transversely disposed neck and an offset head, said neck and head being integral with said carrier, said frame being provided with a slot for guiding said neck, and means for oscillating the link for reciprocating the carrier.

2. In a ruffler, the combination with a frame, of a ruffler blade carrier, a link pivoted to the frame and to said carrier, a separator plate carried by the frame, a ruffler blade carried by the carrier above said separator plate, said frame being provided with a cam slot, a neck or stud on the carrier traversing said cam slot, an arm for throwing the link and having a portion for engaging the link and shifting this in one direction, a set screw carried by the arm for directly engaging the link and shifting the same in the reverse direction, and means for holding the set screw in its positions of adjustment.

3. In a ruffler, the combination with a frame, of a ruffler blade carrier, a link pivoted to said frame and to said carrier and provided at its forward and backward sides with engaging faces, a ruffler blade carried by the carrier, means for guiding the carrier, an arm pivoted to the frame and having a face for engaging one of the faces upon said link, a tapped boss mounted upon the arm and having a number of faces disposed in planes parallel to the tap therein, a set screw mounted in said boss, spring fingers carried by said set screw for engaging said faces upon the boss and holding the set screw in its positions of adjustment, said set screw being adapted for engaging the other of said link engaging faces.

4. In a ruffler attachment for sewing machines, the combination with a frame, of a ruffler blade carrier mounted upon the frame for reciprocation, a link pivoted to said frame and to said carrier and having engaging faces at its front and rear sides, an arm pivoted to the frame and having a face for engaging the engaging face upon the rear of said link, a tapped boss square in cross section mounted upon said arm, a set screw in said tapped boss for engaging the engaging face upon the forward side of said link, spring arms carried by said set screw for engaging the side faces of the boss, a head carried by the set screw and a scale of four characters upon the head for indicating the angular adjustment of the screw relative to the sides of the boss.

AMHERST G. LAMB.

Witnesses:
  D. HILDRETH,
  F. L. ROWE.